United States Patent [19]
Gleeson

[11] Patent Number: 5,092,111
[45] Date of Patent: Mar. 3, 1992

[54] MOWERS

[76] Inventor: Alistair E. S. Gleeson, Lismore Road, Camperdown, Victoria 3260, Australia

[21] Appl. No.: 443,994

[22] Filed: Nov. 30, 1989

[30] Foreign Application Priority Data

Dec. 1, 1988 [AU] Australia ............... PJ1723

[51] Int. Cl.$^5$ ............... A01D 34/66; A01B 73/00
[52] U.S. Cl. ............... 56/13.6; 56/15.5; 56/228
[58] Field of Search ............... 56/13.6, 14.9, 15.1, 56/15.2, 15.3, 15.5, 15.7, 15.8, 17.1, 17.2, 228, 255, 11.6; 474/101

[56] References Cited

U.S. PATENT DOCUMENTS

| | | | |
|---|---|---|---|
| 2,816,410 | 12/1957 | Nobles | 56/255 |
| 3,063,225 | 11/1962 | Barrentine | 56/15.2 |
| 3,457,714 | 7/1969 | Kamlukin | 56/255 |
| 3,893,283 | 7/1975 | Dandl | 56/228 |
| 4,026,365 | 5/1977 | Andersson et al. | 56/228 |
| 4,497,160 | 2/1985 | Mullet et al. | 56/13.6 |
| 4,573,309 | 3/1986 | Patterson | 56/228 |
| 4,658,572 | 4/1987 | Honey et al. | 56/228 |
| 4,682,462 | 7/1987 | Johnson, Sr. | 56/228 |
| 4,759,172 | 7/1988 | Purrer et al. | 56/13.6 |

Primary Examiner—Bruce M. Kisliuk
Attorney, Agent, or Firm—Andrus, Sceales, Starke & Sawall

[57] ABSTRACT

A mower suitable for attachment to a vehicle having a raisable hitch. The mower includes a body adapted to carry a plurality of cutters. A draw bar attaches one end of the body to the hitch for being raised and lowered by the hitch. The body extends laterally outward of the vehicle when in the mowing position. One or more wheels are pivotally mounted to the body by one or more arms, said wheels being located on the body laterally of and remote from the vehicle when the mower is in use. A lever arm is mounted to move with the hitch. A connector connects the lever arm to a fixed point on the vehicle. A linkage transmits movement of the lever arm to the wheel mounting arms to raise or lower the body of the mower with respect to the wheels in response to the raising or lowering of the end of the body adjacent the draw bar.

7 Claims, 7 Drawing Sheets

MOWERS

This invention relates to mowers and which expression is intended to include slashers within its scope.

Mowers are known which are capable of being drawn by tractors for the purpose of mowing hay, mowing grass and for general clearing and slashing purposes.

Reference is made to the specification of Australian Patent Application No. 81666/87 which discloses a cutter assembly which may be used in conjunction with the present invention.

In one instance the present invention provides a mower comprising a body adapted to carry cutter means, attachment means enabling the body to be attached to the tractor via a raisable drawbar or by part at least of a 3-point linkage of the tractor to extend laterally outward of the tractor, one or more wheels located on the body in use laterally of and remote from the tractor, wherein the body adjacent said drawbar or said 3-point linkage can be raised or lowered by raising or lowering said drawbar or at least part of said 3-point linkage and further comprising moving means for raising or lowering the body of the mower with respect to said one or more wheels in response to the raising or lowering of the body adjacent said drawbar or said 3-point linkage.

Preferably said one or more wheels are mounted on one or more arms and said moving means is adapted to act between said one or more arms and the body.

Preferably said one or more arms are pivotally mounted to said body.

Preferably said moving means comprises linkage means adapted to transmit raising or lowering movement of the drawbar or at least part of said 3-point linkage to said one or more arms.

Preferably said linkage means comprises a lever arm mounted to move with the drawbar or 3-point linkage, connector means for connecting the lever arm to a fixed point on the tractor and means for transmitting movement of the lever arm to said one or more wheels.

The present invention also provides a mower adapted to be attached to a tractor to be trailed therebehind in a first orientation and including a pivot having a vertical axis adapted to permit pivoting of the mower about said vertical axis from said first orientation to a second orientation in which the mower extends laterally outward of the tractor in use.

Preferably the mower includes at least one support wheel which, in said first orientation, is trailing and which, in said second orientation, is located laterally outward of the tractor in use. To enable the support wheel to be effective in both orientations it is preferred to mount it as a castor wheel.

Releasable securement means is preferably provided for attachment between the tractor and the mower when the mower is in said second orientation to hold the mower in that orientation.

In one instance the mower comprises a drawbar and a frame which supports cutters. In this instance the frame may be pivotally mounted to the drawbar and can pivot with respect to the drawbar so that it extends in said first orientation or so that it extends in said second orientation.

A coupling member may be provided for holding the frame in each of a selected one of the first orientation and the second orientation. It is preferred that the coupling member is in compression at least when the frame is in the second orientation and the mower is in use.

It is preferred that a latching member is provided for holding the coupling member in a first position in which it will hold the frame in the first orientation and for holding the coupling member in a second position in which it will hold the frame in the second orientation. It is preferred that means is provided for guiding the coupling member in moving between the first and second members.

Preferably said latch member is movable remotely such as from the drivers seat of a tractor and remote moving means such as an hydraulic means, cord, wire, bar or other may be provided.

Preferably the mower is constructed to be adapted to be attached to the tractor so as to enable the attached portion to be raised and lowered by a raisable drawbar or by part at least of a 3-point linkage of the tractor.

Preferably said pivot or another pivot also allows pivoting of the mower about an horizontal axis during such raising or lowering. In a particularly preferred instance, the first mentioned pivot is a universal joint. The universal joint may be an offset universal joint.

To maintain the attitude of the mower when it is raised or lowered as aforesaid it is preferred that said support wheel may be raised or lowered relative to a cutter of the mower. Such raising or lowering of said support wheel might be effected by hydraulic means but it is presently preferred to effect it by linkage means adapted to be attached to the tractor whereby the whole mower, apart from said support wheels, may be raised or lowered. A preferred linkage means includes cables and lever arms.

In another instance, the present invention provides a mower comprising a body, generally vertical shafts mounted to the body and each adapted to carry a cutter, wherein the shafts are laterally inclined at the upper ends with respect to the direction of travel of the mower when in use in cutting grass, hay or like.

The shafts may also be forwardly inclined if desired.

In this instance it is preferred that there are three such shafts and that a drive means is provided comprising pulleys coupled to pulleys mounted on the shafts by drive belts.

In a particularly preferred instance two of the three shafts are driven, in use, by the drive belts in one direction of rotation and the other of the shafts is driven, in use, by a crossed drive belt so as to rotate in the opposite direction of rotation.

In this instance it is preferred that said two of the three shafts are inclined at their upper ends towards one side of the mower and that said other of the shafts is inclined at its upper end laterally towards the opposite side of the mower.

In the last instance it is preferred that the drive means comprises a generally vertical shaft to which the pulleys of the drive means are attached and that the shaft of the drive means is inclined at its upper end towards said one side of the mower whereby the drive and return springs of said crossed drive belt may cross with reduced touching of one another.

The crossed belt need not be used and all shafts may rotate in the same direction and have the same inclination.

Preferably the pulleys on said shafts are all mounted at substantially the same height.

Preferably said shafts are all of substantially the same length.

In another instance the present invention provides a mower comprising a body, three generally vertical shafts mounted to the body and each adapted to carry a cutter, pulleys on the shafts, a drive member having pulleys thereon connected to the pulleys on said shafts by drive belts and wherein the drive member is mounted to be movable whereby to adjust, in use, tension in the drive belts.

Preferably the drive member is mounted to a frame to be movable thereon.

Adjustment of the position of the drive member is preferably effected by means of an adjustment screw.

The mower may include more than one cutter and in this instance it is preferred to drive a gearbox on the mower by means of a power take-off associated with the tractor. From that gearbox a V-belt may be used for each cutter to drive the cutter. Adjustment of tension in the V-belts is preferably at least in part effected by mounting the gearbox to be movable. In one instance, screw means is provided to urge the gearbox in a direction tending to tighten the V-belts.

The present invention in a preferred aspect utilizes the abovementioned universal joint to provide horizontal and vertical axes of pivoting for the mower. There is also a third axis of pivoting which is horizontal and which is preferably provided by the lower two points of a 3-point linkage of the tractor.

As significant damage can be done if the mower accidentally strikes a tree or post during mowing it is preferred that a break-away facility be provided. Such a facility may be provided by shear bolts which can shear under excessive load or by means of spring loaded latch means.

Figure 1:
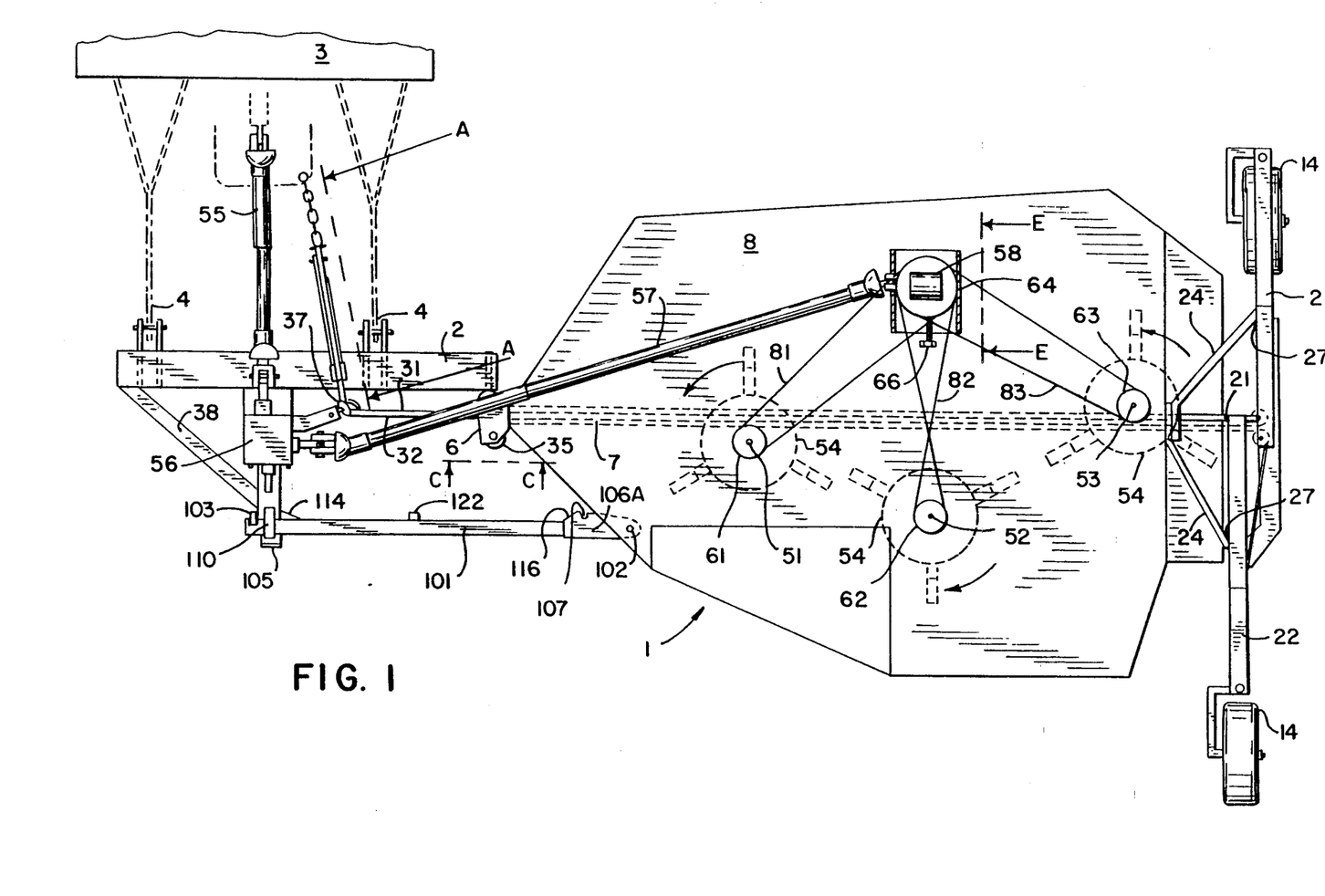
FIG. 1 is a top plan view of the mower in a mowing position.

The mower 1 shown in the drawings comprises a drawbar 2 adapted to be attached to a tractor 3 via the two lower points 4 of a 3-point linkage (see FIG. 1).

Attached to one end of the drawbar 2 is an off-set universal joint 6 and attached to that joint 6 is a main frame beam 7 of the mower (see FIG. 1).

A cover 8 is mounted to the beam 7 and a downwardly extending member 8A projects from the beam 7 and at its lower end supports a lower frame member 9.

Figure 2:
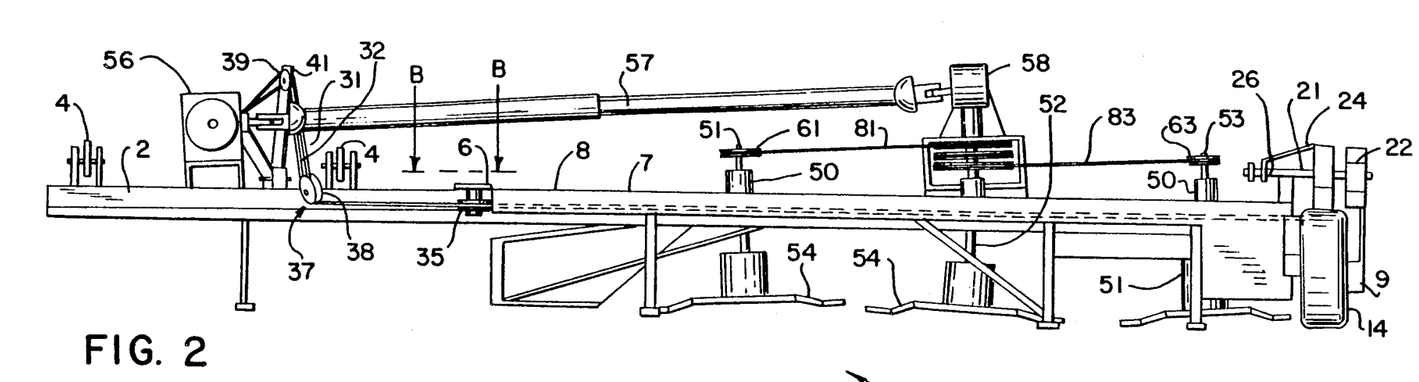
FIG. 2 is a rear elevation of the mower shown in FIG. 1.
Figure 3:
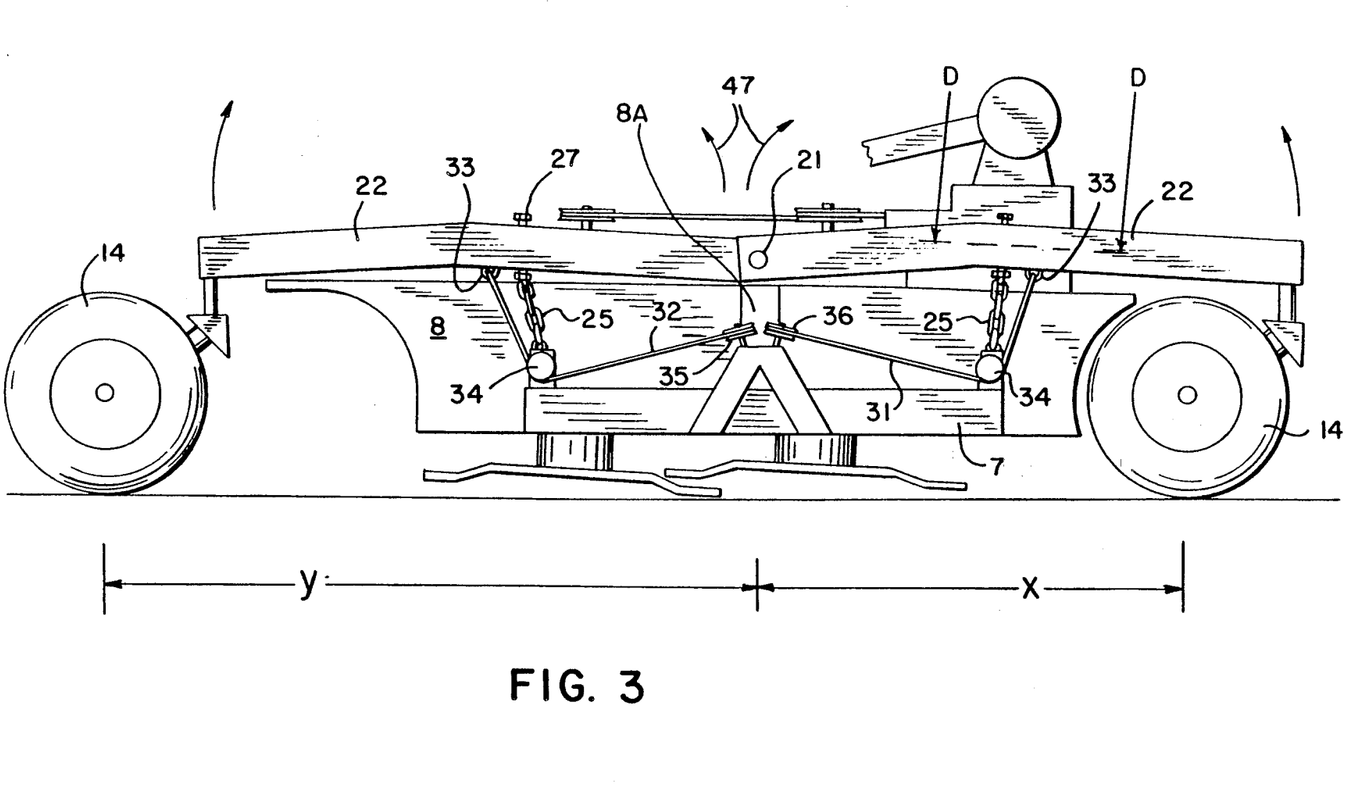
FIG. 3 is a side elevation of the mower shown in FIG. 1.

Mounted on the beam 7 is a pivot pin 21 and mounted to that pin 21 are two cranked arms 22 (see FIGS. 2 and 3).

Castor wheels 14 are mounted to the arms 22 (see FIG. 3).

Stabilizer arms 24 extend from the cranked arms and are themselves pivotally mounted to the frame 7 by means of a pivot pin 26.

The cranked arms 22 can pivot about the pin 21 and in so doing the frame 7 and part connected thereto may raise and lower. Height adjusting screws 27 are provided on the arms 22 and through chains 25 limit the minimum height of the frame 7 above ground (see FIG. 3).

In use the frame 7 can be raised at the drawbar thereof by operation of the tractor's 3-point linkage. However, while this will cause raising of the end of the frame 7 at the universal joint 6, that universal joint 6 will allow the frame to pivot and in consequence the end of the frame 7 containing lower frame member 9 would not raise. However, a mechanism is provided for raising the lower frame member end of the frame 7.

That mechanism comprises cables 31 and 32 which are attached to fixed lugs 33 on the cranked arms 22 and which pass over pulleys 34 located on the lower frame member 9, pulleys 35 and 36 located on the frame 7, pulleys 37 located on a bracket 38 which is mounted to the drawbar 2, and pulleys 39 mounted on an L-shaped arm 41 which is itself pivotally mounted to the drawbar 2 by a pivot pin 42. The cables 31 and 32 are also attached to the arm 41 (See FIG. 3 and 5).

Figure 5:
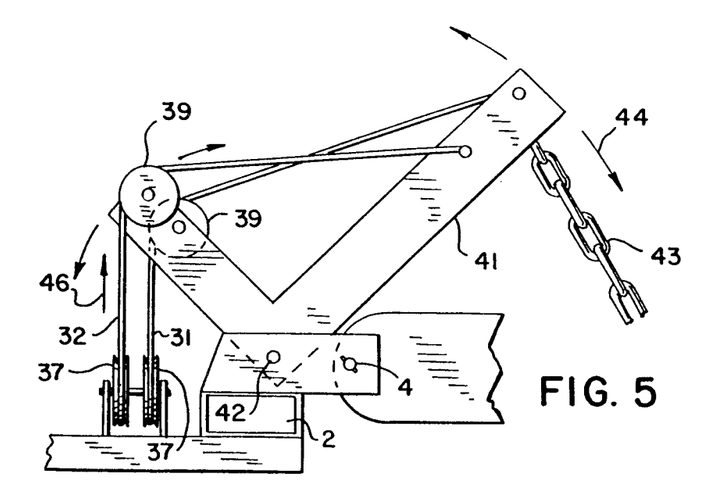
FIG. 5 is a detail on arrow "a" in FIG. 1.
Figure 6:
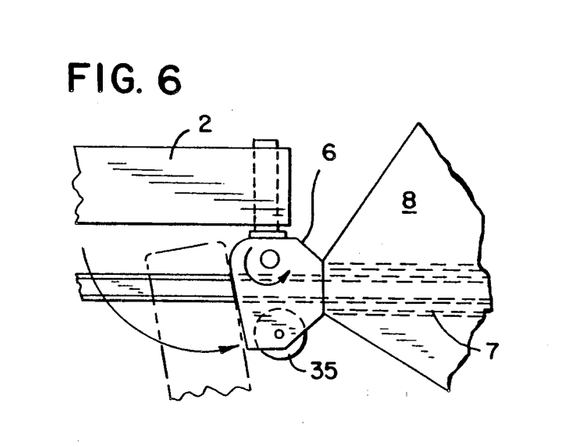
FIG. 6 is a detail on arrow "b" in FIG. 2.
Figure 7:
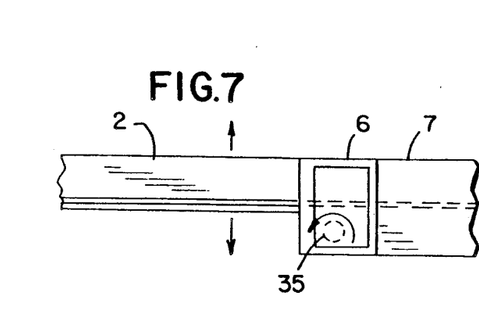
FIG. 7 is a detail on arrow "c" in FIG. 1.

The arm 41 is attached to a fixed point on the tractor by a chain 43 and it will be appreciated that when the drawbar 2 is raised, the arm 41 will move in the direction of arrow 44 in FIG. 5.

Movement of the arm 41 in the direction of arrow 44 will cause the cables to move in the direction of arrow 46 in FIG. 5 and that movement will be transmitted via the lugs 33 to the cranked arms 22 which will turn in the direction of the arrows 47 in FIG. 3 about the horizontal axes of the wheels 14 in FIG. 3 to raise the frame 7 at the lower frame member end.

It will be observed from FIGS. 1 and 3 that one of the wheels 14 is located aft of one of the arms 22 whereas the other one of the wheels 14 is located beneath the other of the arms 22 and that is the condition that the wheels 14 will be in during mowing. Thus it will be appreciated that the distances x and y shown on FIG. 3 are different and hence the radius of turning in the direction of arrows 47 is different for each of the two arms 22. To compensate for that difference, one of the pulleys 39 is attached to the arm 41 at a greater radial position with respect to the pin 42 than the other of the pulleys 39. As a result, it will be possible to adjust the cutting height of the mower to be level from left to right with respect to FIGS. 2 and 3.

Mounted to the frame 7 or cover 8 are bearings 50 (See FIG. 2) which support shafts 51, 52 and 53 which have, respectively, pulleys 61, 62 and 63. Each of the shafts carries a cutter 54. The cutters 54 may be of the form shown in Applicant's Australian Patent Application No. 81666/87 or may be of some other form.

A telescopic power take off shaft 55 extends in use from a power take off of the tractor 3 to a right angle gearbox 56 mounted on the bracket 38 and a telescopic power take off shaft 57 extends from the gearbox 56 to a main drive gearbox 58. The main drive gearbox 58 has pulleys 71, 72 and 73 mounted on a shaft 59 and drive belts 81, 82 and 83 extend to the pulleys 61, 62 and 63 for driving the shafts 51, 52 and 53 (See FIG. 1).

Figure 8:
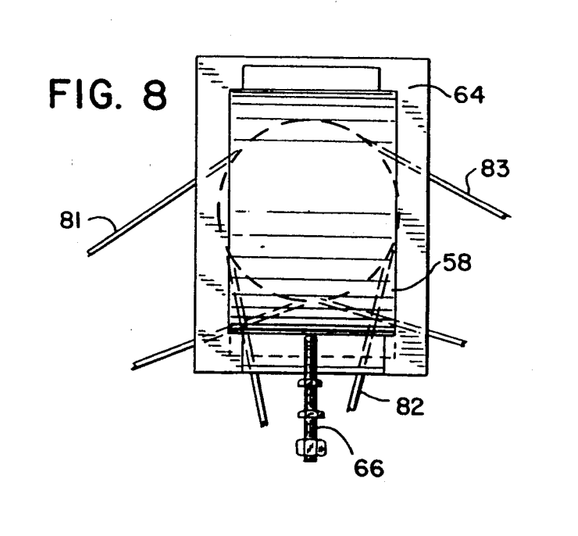
FIG. 8 is a detail on arrow "d" in FIG. 3.
Figure 9:
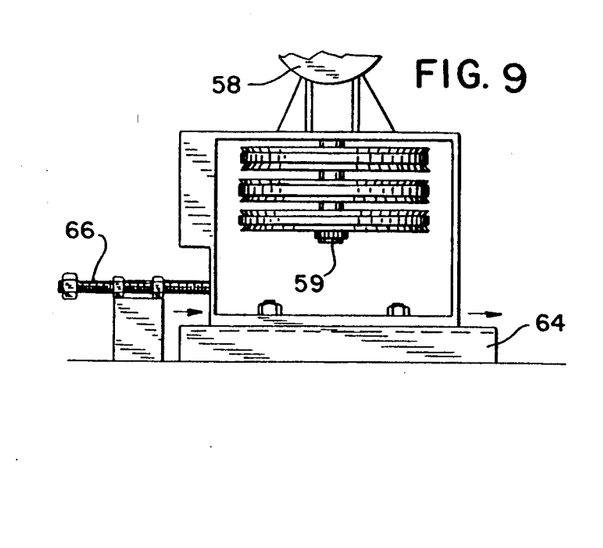
FIG. 9 is a detail on arrow "e" in FIG. 1.

The gearbox 58 is mounted to a frame 64 (FIG. 8) and an adjustment screw 66 is provided for adjusting the position of the gearbox 58 and hence for tensioning the belts 81, 82 and 83.

Each of the shafts 51, 52 and 53 is tilted forwardly, i.e. to the right as shown in FIG. 3. Further, each of the shafts 51, 52 and 53 is also tilted to the side as shown in FIG. 2 and the direction of tilt is determined by the direction of rotation of the respective shaft 51, 52 and 53. In this last respect, the shafts 51 and 53 are to turn anticlockwise when viewed from above and are tilted to the left with respect to FIG. 2 and shaft 52 is to turn clockwise when viewed from above and is tilted to the right with respect to FIG. 2.

The tilting of the shafts 51, 52 and 53 will allow for blade layback if cutters of the form shown in Australian Patent Application No. 81666/87 are used as with such cutters the blades rise as they swing back and tilting of the shafts 51, 52 and 53 ensures a level cut across the mower.

Because of the tilting of shafts 51, 52 and 53, the gearbox 58 is also tilted so that the shaft 59 is slightly off vertical as can be seen in FIG. 2.

The tilting of the shafts 51, 52 and 53 and the gearbox 58 produces a number of advantages. Firstly, by appropriate groove selection of the pulleys 71, 72 and 73 the pulleys 61, 62 and 63 can all be set at the same height. This means that shafts 51, 52 and 53 can be the same length and this is commercially advantageous in that stocks of spare parts can be reduced. The belts 81, 82 and 83 can all be of the same length.

Figures 11, 12:
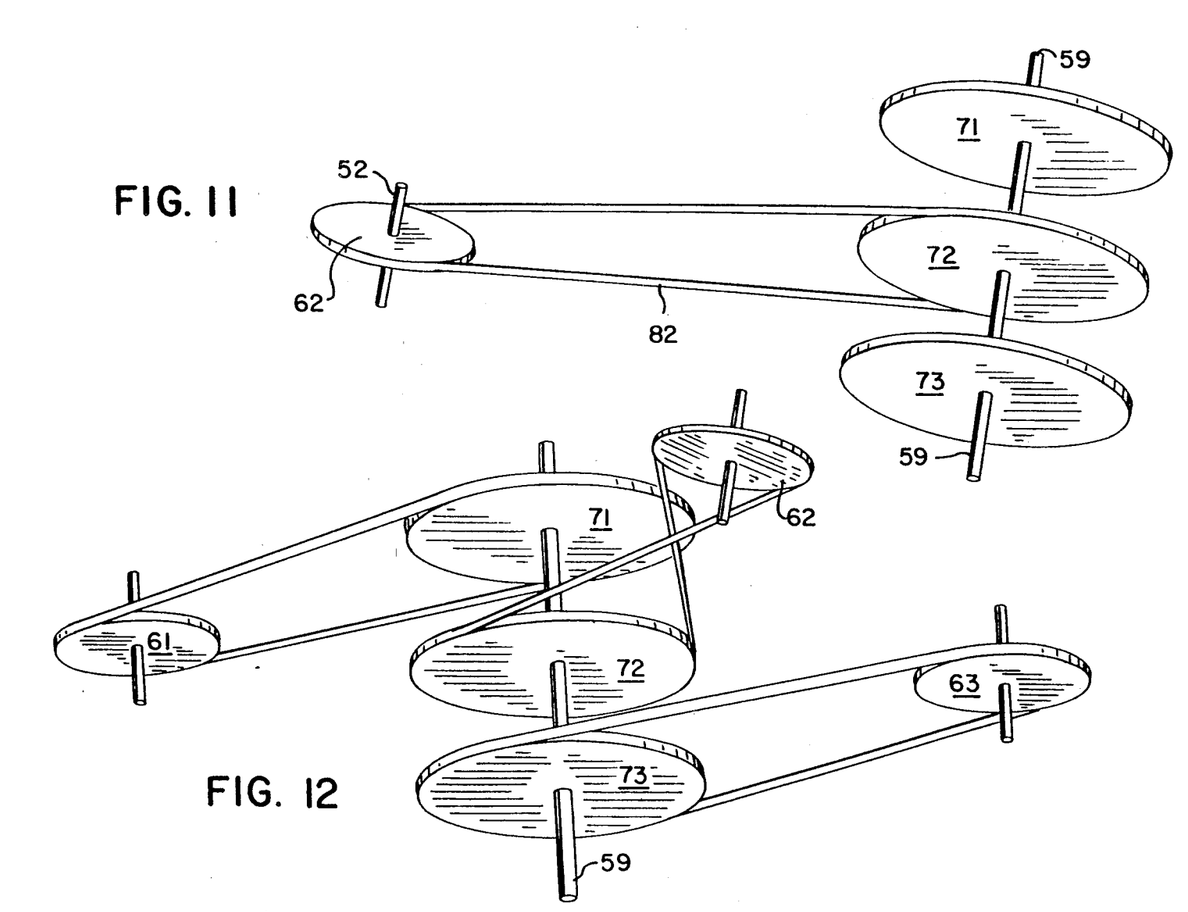
FIG. 11 is a schematic drawing of a part of the mower of FIG. 1.
FIG. 12 is a schematic drawing of a part of the mower of FIG. 1.

Next, the belt 82 needs to cross itself to obtain the desired direction of rotation of the shaft 52 and the opposite tilting of shafts 52 and 54 ensures that the belt 82 may be mounted to cross itself but not touch itself as is shown in FIGS. 11 and 12.

To retain the mower 1 in the mowing position shown in FIG. 1-3 in which it extends laterally of and to the side of the tractor 3 an arm 101 extends from the cover 8 to the bracket 38. That arm 101 is pivotally attached to the cover 8 by a pivot pin 102 and is secured to the bracket 38 by means of a latch bar 103 which is located in a notch 104 in a plate 106 located on an end of the arm 101 (See FIG. 4). Another plate 106A with a notch 107 is located near the end of the arm 101 adjacent the pin 102.

Figure 4:
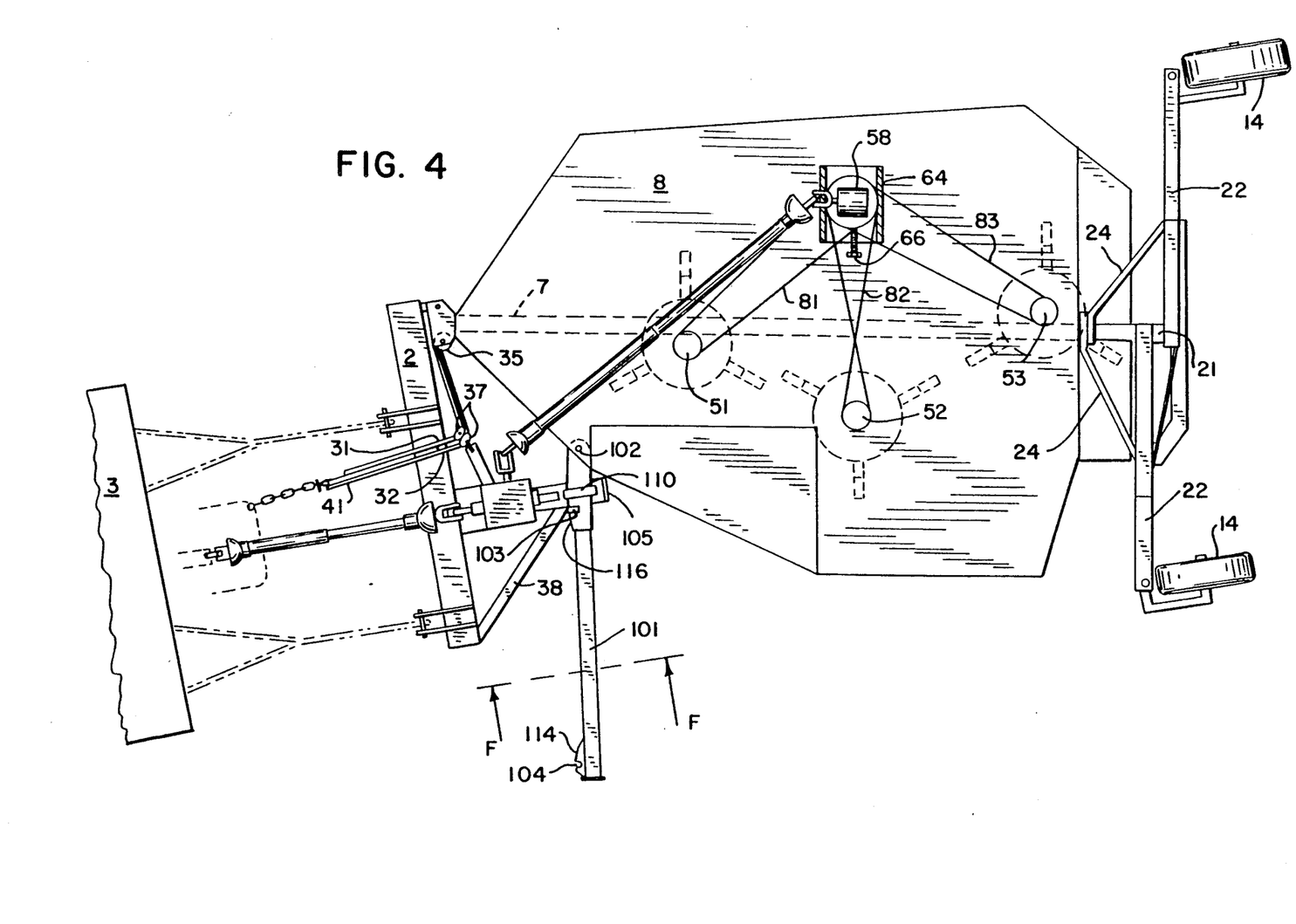
FIG. 4 is a top plan view of the mower of FIG. 1 but in a trailing position.
Figure 13:
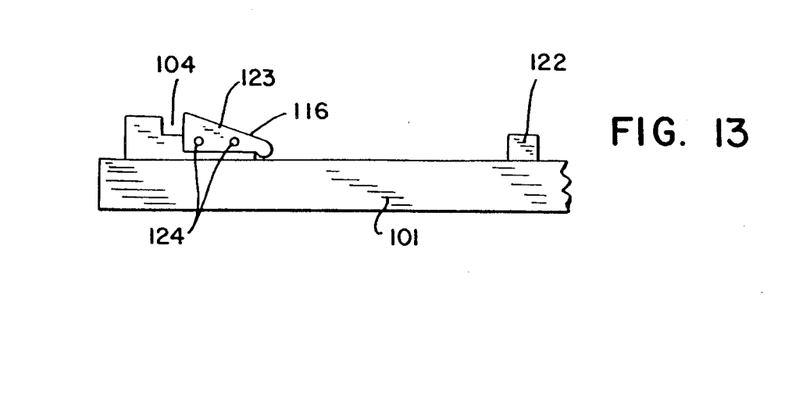
FIG. 13 is a detail of a modified part of the mower shown in FIG. 1.

The plates 106 and 106A have ramp surfaces 114 and 116 (See FIGS. 1, 4, and 13).

In use of the mower 1 in the mowing position shown in FIGS. 1-3 the arm 101 will be in compression rather than tension.

Figure 10:
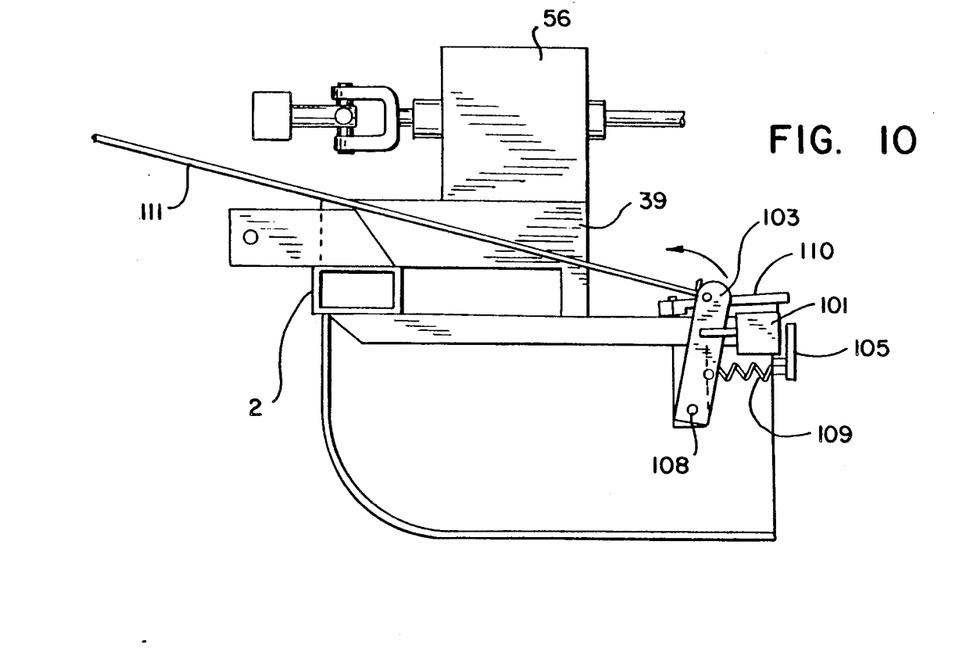
FIG. 10 is a detail on arrow "f" in FIG. 4.

The latch bar 103 (See FIG. 10) is pivotally mounted to the bracket 38 by means of a pivot pin 108 and is biased towards a rearward position in which it is engaged in the notch 104 when the mower 1 is in the moving position by means of a spring 109 which is attached to an abutment 105 which in turn is attached to the bracket 38.

The abutment 105 and an upper plate 110 capture and guide the arm 101.

A cord 111 (FIG. 10) extends from the top of the latch bar 103 to the tractor 3 at a position adjacent a driver of the tractor.

When the driver of the tractor desires to cease mowing and to move the tractor 3 and the mower 1 to some place of storage, the driver can pull on the cord 111 to release the latch bar 103 from the notch 104. The tractor can then be reversed and turned through about 100° and the arm 101 will move and be constrained by the abutment 105 and the upper plate 110. The latch bar can then be released to bear on the arm 101 and will ride up the ramp surface 116 until the latch bar 103 locates in the notch 107. As a result, the mower will be in the trailing position with respect to the tractor as shown in FIG. 4 and can be driven away to the place of storage.

Putting the mower 1 into the mowing position of FIGS. 1-4 is substantially the reverse of the above and the latch bar 103 will ride up the ramp surface 114 to locate in the notch 104.

The above described mower can extend laterally of a tractor or trail behind it. It can be raised in height during use. Further adjustment of belts and replacement of parts is made easy. In moving from the mowing position to the trailing position there is no need for the driver to leave his seat or to disconnect any power take off.

The modified part shown in FIG. 13 relates to the arm 101. A stop 122 is provided on the arm 101 and the ramp surface 116 is provided on a plate 123 which is secured to the bar 101 by shear bolts 124.

In the event that the mower should strike a tree or post, the bolts 124 can shear to allow the mower to pivot at least unitl the stop 122 is reached.

The claims and drawings form part of the disclosure of this specification.

The described arrangement has been advanced merely by way of explanation and many modifications may be made thereto without departing from the spirit and scope of the invention which includes every novel feature and combination of novel features herein disclosed.

The claims defining the invention are as follows:

I claim:

1. A mower suitable for being moved by a vehicle, said vehicle having raisable implement attachment means, said mower comprising:

a body adapted to carry cutter means, attachment means enabling one end of said body to be attached to the implement attachment means of the vehicle for being raised and lowered by the implement attachment means, said body extending laterally outward of the vehicle with respect to the path of travel of the vehicle;

one or more wheels pivotally mounted to said body by one or more arms, said wheels being located on the body laterally of and remote from the vehicle when the mower is in use;

a lever arm mounted to move with the implement attachment means;

connector means for connecting said lever arm to a fixed point on the vehicle; and linkage means for transmitting movement of said lever arm to said one or more wheel mounting arms to raise or lower said body of the mower with respect to said one or more wheels in response to the raising or lowering of said one end of said body by the implement attachment means.

2. A mower as claimed in claim 1, wherein the linkage means comprises one of cables and rods for transmitting said movement.

3. A mower as claimed in claim 1, wherein said one or more wheels are castor wheels.

4. A mower adapted to be attached to a vehicle, said mower comprising:

a first part attachable to the vehicle;

a second part having one end coupled to said first part for being trailed behind the vehicle in a first orientation in which the second part generally follows the vehicle along its path of travel, said second part having, at the other end, one or more wheels that are free to castor in said first orientation and in a second orientation;

pivot means between said first and second parts having a vertical axis adapted to permit pivoting of said second part about said vertical axis from said first orientation to said second orientation in which said second part extends laterally outward of the vehicle with respect to the path of travel of the vehicle for carrying out a mowing operation;

a compression member extending between said first and second parts for holding said second part in said second orientation, said member being subjected to compressive loading when so holding said second part;

releasable means for releasably securing said compression member on one of said first and second parts; and wherein said releasable means includes means responsive to forces applied to said second part for releasing said second part from said second orientation upon the application of force to said second part in excess of a desired limit.

5. A mower as claimed in claim 4, wherein said compression member is further defined as movable to a position in which it holds said second part in said first orientation and wherein guide means is provided for guiding said compression member in so moving.

6. A mower as claimed in claim 4, wherein said compression member is further defined as releasably secured to said first part.

7. A mower as claimed in claim 6, wherein said releasable means includes remotely operable latch means for releasably securing said compression member in a position in which it holds said second part in the second orientation and in a position in which it holds said second part in the first orientation.

* * * * *